(12) United States Patent
Huang et al.

(10) Patent No.: US 10,935,387 B2
(45) Date of Patent: Mar. 2, 2021

(54) SYSTEM AND METHOD FOR TRACKING AND STORING BATTERY DATA, AND UTILIZING THE DATA TO APPROPRIATELY MATCH BATTERIES UPON SWAPPING

(71) Applicant: NIO (ANHUI) HOLDING CO., LTD., Hefei (CN)

(72) Inventors: Chendong Huang, Shanghai (CN); Jie Fang, Shanghai (CN); Wenpeng Zhao, Shanghai (CN); Yaping Jiang, Shanghai (CN); Xiaojia Deng, Richmond Hill (CA)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 194 days.

(21) Appl. No.: 16/230,430

(22) Filed: Dec. 21, 2018

(65) Prior Publication Data

US 2019/0120642 A1   Apr. 25, 2019

Related U.S. Application Data

(62) Division of application No. 15/284,754, filed on Oct. 4, 2016, now abandoned.

(60) Provisional application No. 62/358,322, filed on Jul. 5, 2016.

(51) Int. Cl.
| | | |
|---|---|---|
| *G01C 21/34* | (2006.01) | |
| *H01M 10/42* | (2006.01) | |
| *H01M 10/48* | (2006.01) | |
| *H01M 2/10* | (2006.01) | |
| *H01M 50/20* | (2021.01) | |

(52) U.S. Cl.
CPC ...... *G01C 21/3469* (2013.01); *H01M 10/425* (2013.01); *H01M 10/4257* (2013.01); *H01M 10/482* (2013.01); *H01M 10/486* (2013.01); *H01M 50/20* (2021.01); *H01M 2010/4278* (2013.01); *H01M 2220/20* (2013.01)

(58) Field of Classification Search
CPC ............ G01C 21/3469; H01M 10/425; H01M 10/482; H01M 10/486; H01M 10/4257; H01M 2/107; H01M 2010/4278
See application file for complete search history.

(56) References Cited

U.S. PATENT DOCUMENTS

| | | | |
|---|---|---|---|
| 2011/0071932 A1* | 3/2011 | Agassi | B60L 3/12 705/34 |
| 2012/0116699 A1 | 5/2012 | Haag et al. | |
| 2016/0190833 A1 | 6/2016 | Roumi et al. | |
| 2018/0010919 A1 | 1/2018 | Huang et al. | |

OTHER PUBLICATIONS

Official Action for U.S. Appl. No. 15/284,754, dated Oct. 12, 2018 8 pages Restriction Requirement.
Official Action for U.S. Appl. No. 15/284,754, dated Jan. 25, 2019 18 pages.

\* cited by examiner

*Primary Examiner* — Anne Marie Antonucci
(74) *Attorney, Agent, or Firm* — Sheridan Ross P.C.

(57) ABSTRACT

A system and method for monitoring the health of smart battery packs in an electric vehicle and determining when one or more of the smart battery packs needs to be replaced. In addition, the system and method locate optimal smart battery packs to exchange with the one or more battery packs that need to be replaced.

13 Claims, 18 Drawing Sheets

SYSTEM AND METHOD FOR TRACKING AND STORING BATTERY DATA, AND UTILIZING THE DATA TO APPROPRIATELY MATCH BATTERIES UPON SWAPPING

This application is a division of U.S. Nonprovisional patent application Ser. No. 15/284,754 having a filing date of Oct. 4, 2016, which claims the benefit of U.S. Provisional Application No. 62/358,322 having a filing date of Jul. 5, 2016, the disclosure of each of which are incorporated herein by reference.

BACKGROUND

Modular battery packs having a different number of life cycles and different physical states (i.e., different amounts of "usage" or cycles) should not be mixed for use, due to efficiency and safety issues caused by inconsistencies between modular packs. Mixing the packs that have different indicators of battery health has undesirable consequences that could negatively affect the long term operation of each individual battery pack as well as the operation of an electric vehicle.

BRIEF DESCRIPTION OF THE DRAWING(S)

A more detailed understanding may be had from the following description, given by way of example in conjunction with the accompanying drawings wherein.

DETAILED DESCRIPTION OF THE PREFERRED EMBODIMENTS

For electric vehicles (EVs), when it is time to change out or "swap" a portion of the installed battery packs, manufacturers should optimally ensure that they adhere to the following:

a. All packs in one vehicle should have similar values for the indicators of battery health.

b. All packs should be swapped together.

These limitations are extremely inconvenient. When only a single battery pack fails, replacing all of the batteries instead of only the failed battery is extremely expensive. In addition, the disposal of the battery packs generates additional electronic waste which under many government regulations must be properly disposed of by the manufacturer.

Additionally, in the context of a split battery scheme, where an EV has a first portion which is permanent and a second portion of which is swappable, replacing all of the batteries at once is unworkable, and would defeat the purpose of the split battery scheme.

The present scheme includes smart batteries, whereby each battery has an associated memory, with an optional associated processor, that stores the life cycle information for the particular battery pack. This information is then transmitted to a database maintained by the manufacturer and subsequently used in the selection of the battery pack to be swapped into the EV.

Figure 1:
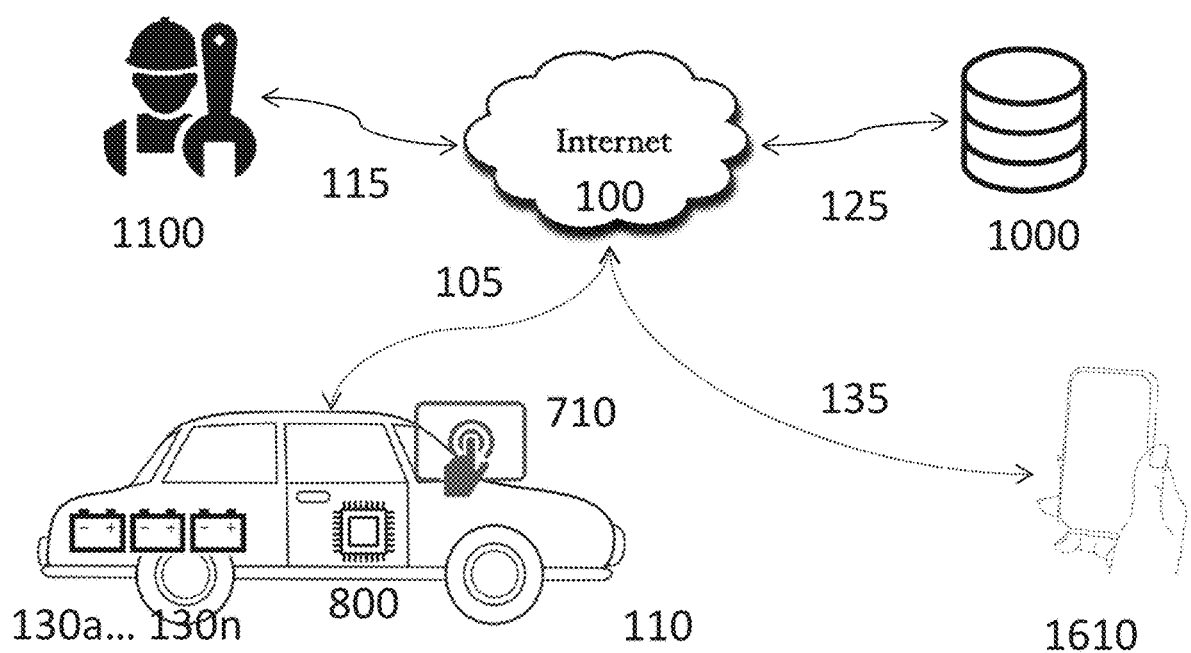
FIG. 1 is an example system for managing the swapping of batteries in an electric vehicle.

FIG. 1 depicts a diagram of an example system practicing the method of selling cars. In the system, an EV 110 contains an array of smart battery packs 130*a* . . . 130*n* that provide the power to drive the EV 110. The EV 110 also contains an electric vehicle computer (EVC) 800 that is communicatively coupled to the array of smart battery of smart battery packs 130*a* . . . 130*n*. The EV 110 may also include a user interface 710. The EVC 800 may also be able to communicate with the Internet 100 via a wireless communication channel 105. A plurality of battery swap centers 1100 are also connected to the Internet 100 via communication channel 115. A server 800 is also connected to the Internet 100 via communication channel 125. A user computer 1500 may also connect to the Internet 100 via a wireless communication channel 135. The wireless communication channels 105 and 135 may be of the form of any wireless communication mechanism such as LTE, 3G, WiMax etc.

Figure 2:
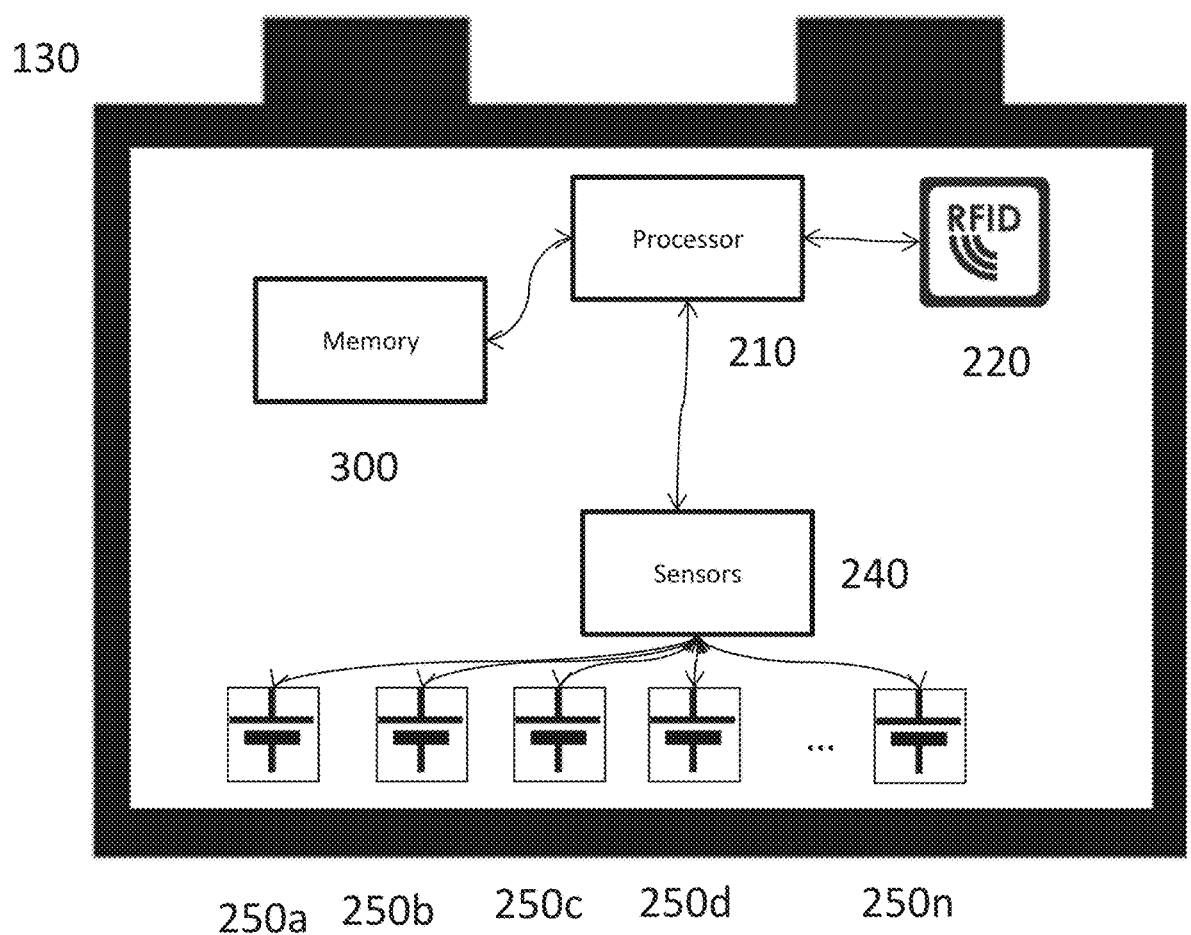
FIG. 2 is a graphic depiction of an embodiment of the smart battery pack.

FIG. 2 depicts an example of smart battery pack 130. The smart battery pack 130 includes a plurality of battery cells 250*a*, 250*b*, 250*c*, 250*d* . . . 250*n*. The battery cells may be of any form known in the art such as Lithium ion, Aluminum ion or Magnesium ion. The smart battery pack 130 may also include one or more sensors 240 that monitor the operational parameters of the individual battery cells 250*a*, 250*b*, 250*c*, 250*d* . . . 250*n*. The sensors 240 may measure the voltage, current, resistance, inductance, capacitance and temperature of the battery cells 250*a*, 250*b*, 250*c*, 250*d* . . . 250*n*. The sensors 240 transmit the measurements to a processor 210.

The processor 210 may determine a health indication for each of the individual cells. The health indication may be determined based upon the measurements received from the sensors 240. In addition, the processor may determine the health indicators for each individual cell 250*a*, 250*b*, 250*c*, 250*d* . . . 250*n* based upon information stored in the memory 300. The processor 210 may then calculate a battery pack health indicator value for the smart battery pack 130 based upon the health indicators of each individual cell 250a, 250b, 250c, 250d . . . 250n. In addition, the processor 210 may further determine the battery pack health indicator based upon information stored in the memory 300. Alternatively, the processor 210 may determine the battery pack health indicator value for the smart battery pack 130 based on the measured values without determining the health indicator of each individual cell 250a, 250b, 250c, 250d . . . 250n. In this embodiment, the processor 210 determines the battery pack health indicator of the smart battery pack 130 based upon the combined measurements of the operational parameters of each individual cell 250a, 250b, 250c, 250d . . . 250n and information stored in the memory 300. In either embodiment, the processor 210 may rely upon a maximum, minimum, average, or moving average value of the operational parameters to determine the battery back health indicator or the health indicator of the each individual cell 250a, 250b, 250c, 250d . . . 250n.

The processor 210 is communicatively coupled to a communication module 220. The communication module 220 may implement any communication protocol such as a near field communication (NFC), RFID, Bluetooth, WiFi or any other wireless communication protocol known in the art. The processor 210 may instruct the communication module 220 to transmit the measurements obtained by the sensors 240 and values stored in the memory 300 to the EVC 800. The transmission to the EVC 800 may be continuous, at fixed intervals, or whenever a new measurement is made. In addition, the communication module may transmit the health indicators of the individual battery. Further, the communication module may transmit the battery pack health indicator value to the transceiver 410 when installed in EV 110 or transceiver 1110 when at swap center 1100. In some embodiments, the communication module 220 may receive additional sensor information from an external sensor such as battery sensors 520. This additional information may be stored in the memory 300 and used by the processor 210 to determine the battery pack health indicator value.

Figure 3:
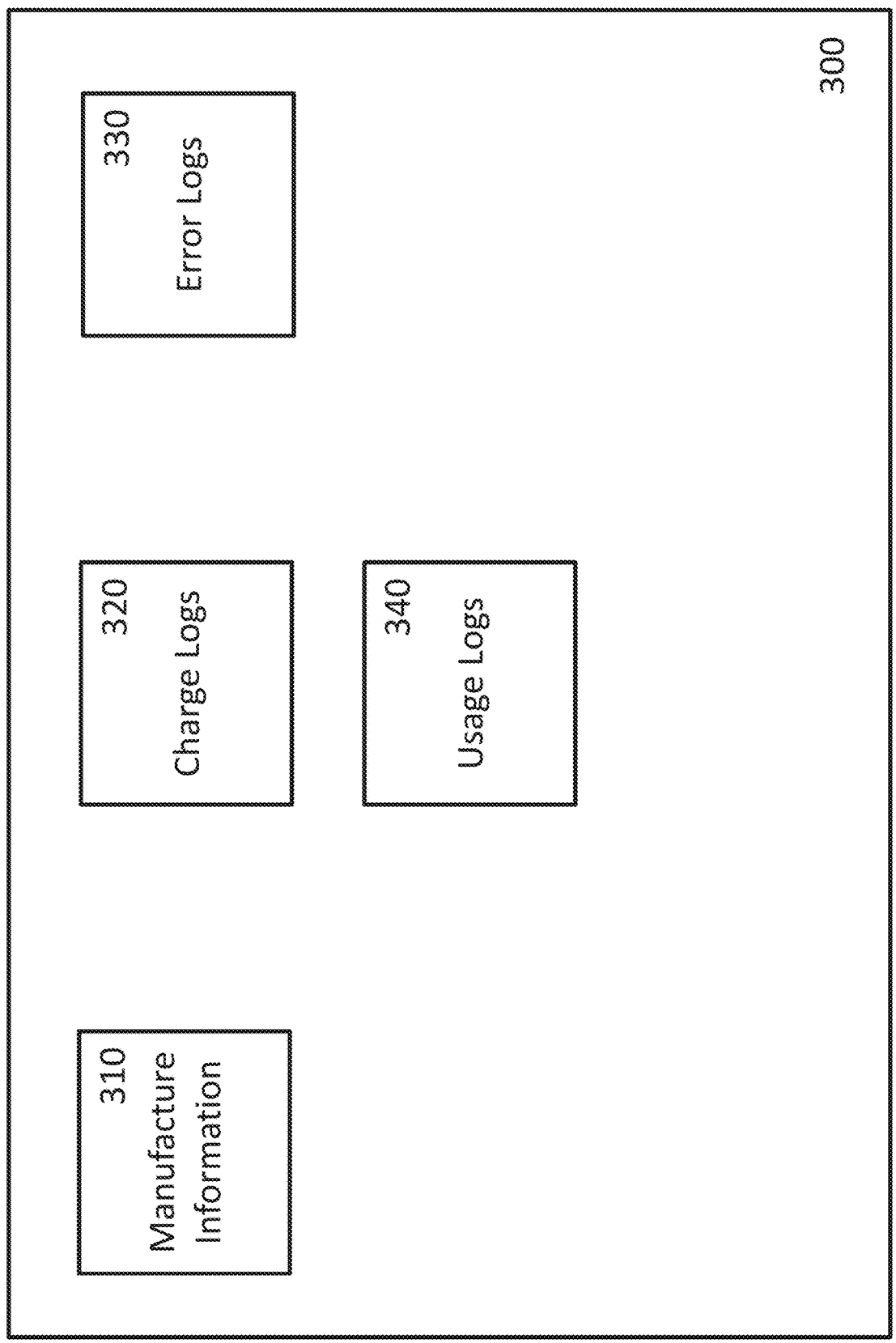
FIG. 3 is a graphic depiction of the information that may be stored in a memory of the smart battery pack.

The memory 300, shown in FIG. 3, may store manufacture information 310, charge logs 320, error logs 330, and usage logs 340. The manufacture information 310 may include information such as a unique serial number of the smart battery pack 130, the date of manufacture, the name of the manufacturer, and the model of the battery. The charge logs 320 may include information regarding the date, time, and location that the battery was charged. It may also include information on the type of charger that was used to charge the battery and whether the charging was performed by the EV 110 or an external source. The error logs 330 may store information including, time, date and location when an error condition is detected by the processor 210. The error conditions may include over-voltage, under-voltage, over current, under current, and over temperature. The usage logs 340 may include information regarding the time, date, and location when the battery was being discharged. It may also include information regarding the rate of discharge. The memory may be comprised of any storage technology known in the art such as solid state drives or flash memory.

Figure 4:
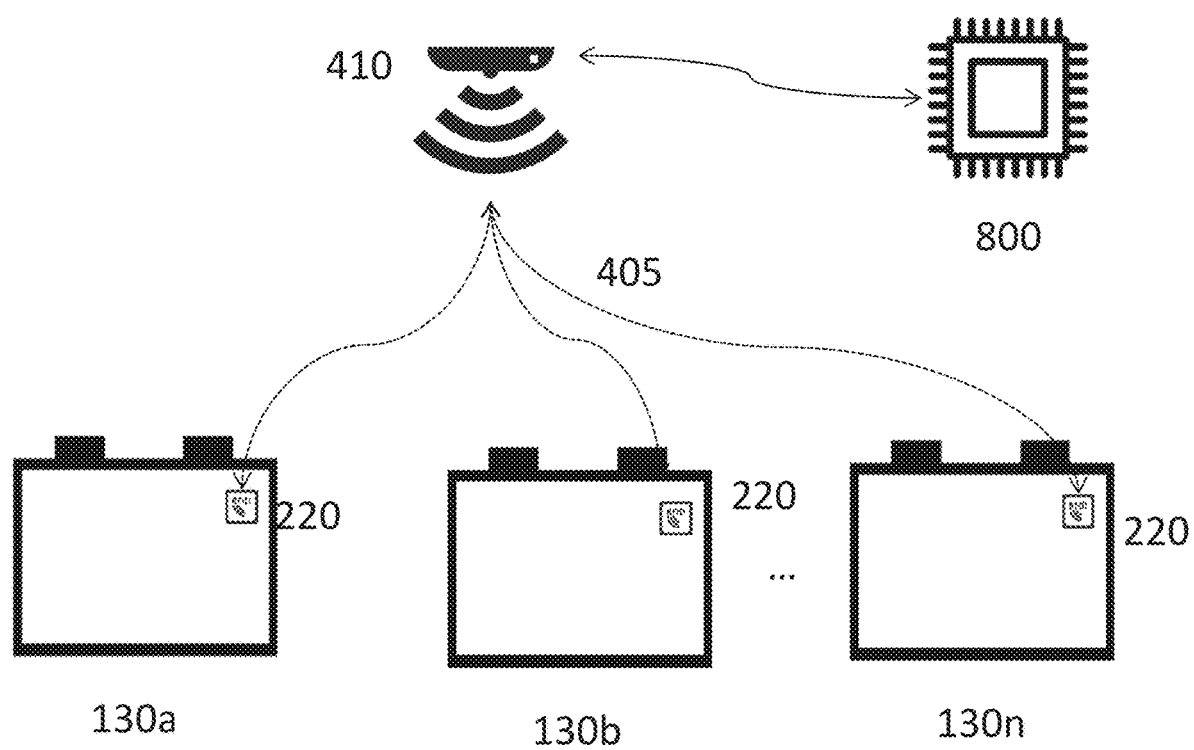
FIG. 4 is a diagram of the communication between an array of smart battery packs and the electric vehicles computer.
Figure 5:
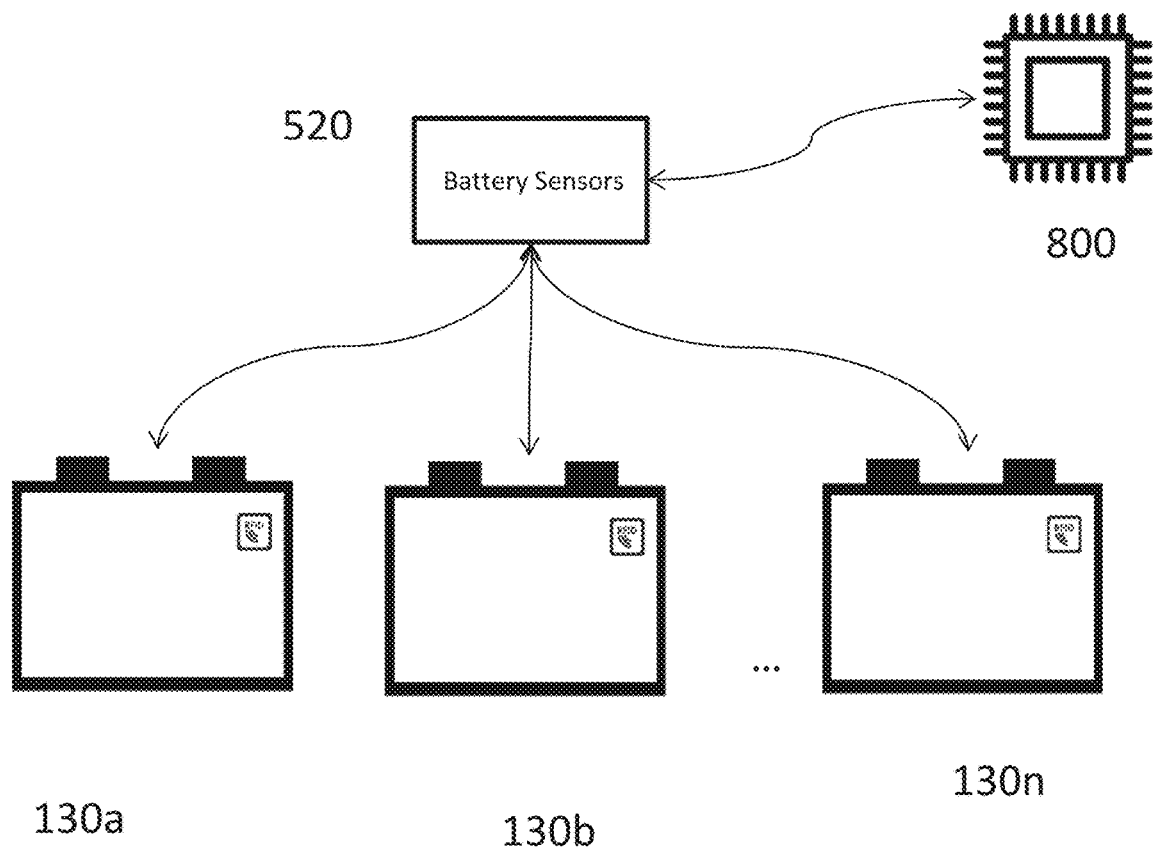
FIG. 5 is another diagram of the communication between an array of smart battery packs and the electric vehicles computer.

The communication module 220 of the smart battery packs 130a, 130b . . . 130n may communicate with the EVC 800 over wireless communication channel 405 via transceiver 410 as shown in FIG. 4A. The wireless communication channel 405 may be of any wireless communication protocol that is compatible with the communication module 220. The transceiver 410 automatically detects when a new smart battery pack is installed and transmits information about the new smart battery pack to the EVC 800. FIG. 5 shows that the EVC 800 may also be communicatively connected to a battery sensor 520. The battery sensor 520 measures parameters of each individual smart battery 130a, 130b . . . 130n. These sensed parameters may include voltage, current, resistance, inductance, capacitance, and temperature. In addition, the battery sensor 520 may also measure the ambient temperature of the EV 110 when the vehicle is both in and out of operation. The battery sensor 520 may be used independently or in conjunction with the sensors 240 of each individual smart battery pack. The measurements of the parameters measured by the battery sensor 520 are transmitted to the EVC 800. The EVC 800 may compare the measurements of the battery sensor 520 with the values reported by the individual smart battery packs 130a, 130b . . . 130n. This comparison may be used to determine which smart battery packs should be replaced.

Figure 6:
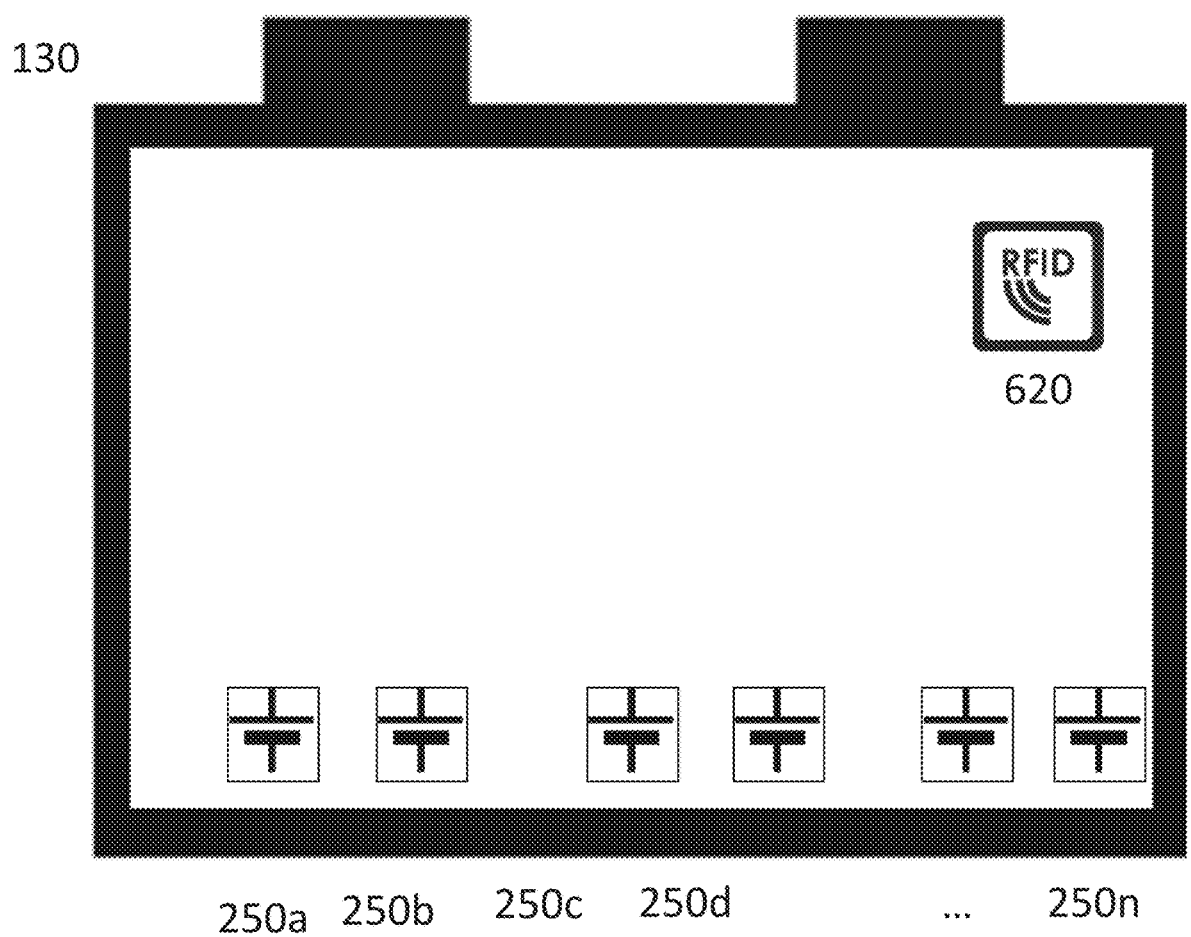
FIG. 6 is a diagram of an alternate embodiment of the smart battery pack.

FIG. 6 depicts an alternative embodiment of the smart battery cell 130. In this embodiment, the smart battery cell 130 contains only the individual battery cells 250a, 250b, 250c, 250d . . . 250n and a wireless Tag 620. The wireless tag 620 stores a unique number that individually identifies each particular smart battery cell. This embodiment does not require the processor 210, memory 300 and sensors 240. In this embodiment, the functionality of processor 210, memory 300 and sensors 240 is accomplished external to the smart battery cell 130 and in the sensor 520 and the EVC 800.

Figure 7:
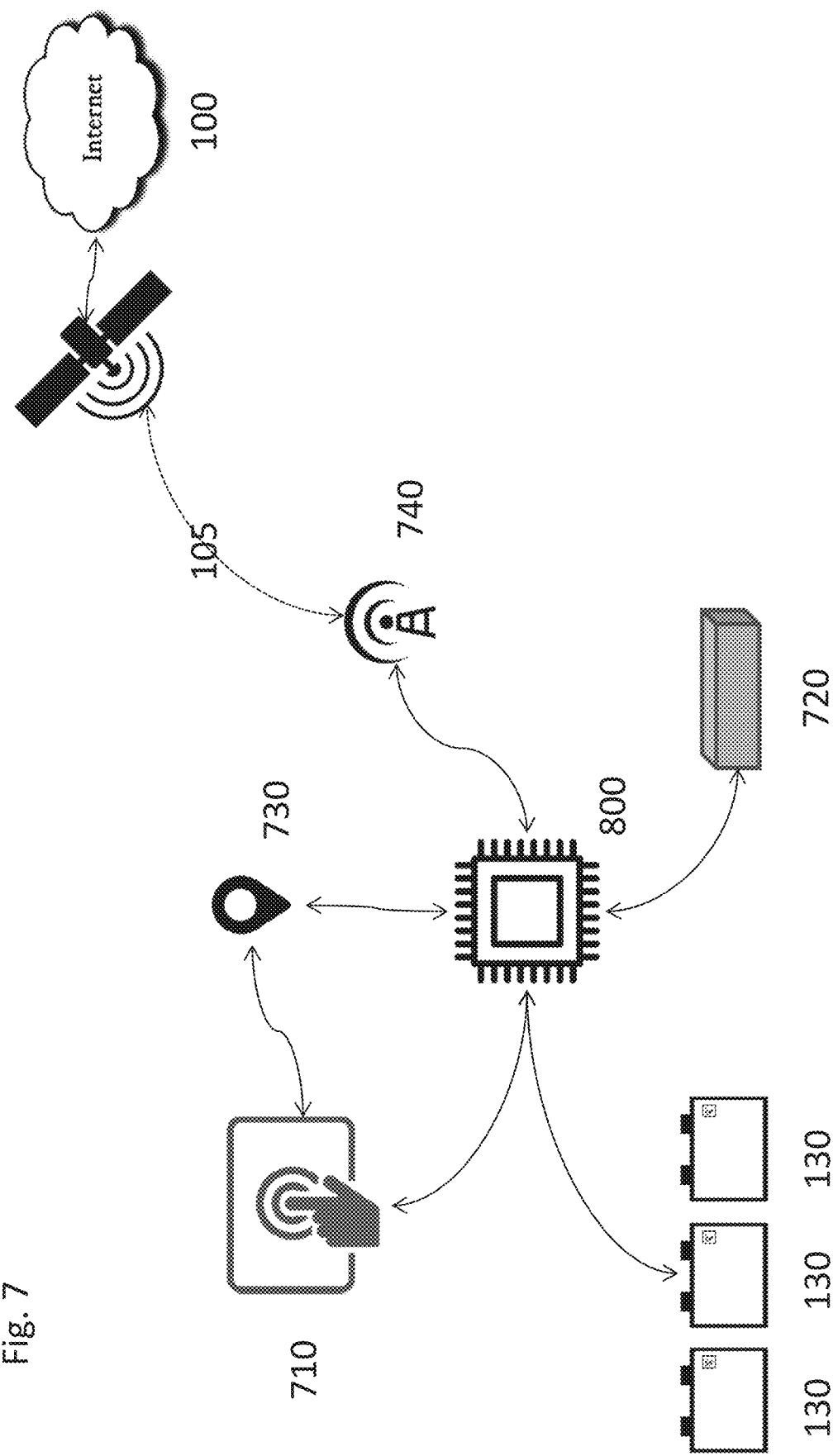
FIG. 7 is a diagram of the devices connected to the electric vehicle computer.

The communicative connections of the EVC 800 are graphically shown in FIG. 7. The EVC 800 is communicatively coupled to a user interface 710. The EVC 800 may instruct the user interface 710 to display information stored in the memory 810 or storage 820 of the EVC. The user interface 710 may include a touch screen that enables the user to input information to the EVC 800. The user interface 140 may be a discrete device or integrated into an existing vehicle entertainment or navigation system.

The EVC 800 may also be communicatively coupled to telemetric device 720. These so called "black boxes" monitor the operation of the EV 110 and are often implemented by the insurance industry. These devices may record operational parameters of the EV 110, such as the application of the gas pedal, brakes, speed, engine temperature, brake temperature, and other parameters relevant to the operation of a vehicle. In addition, the telemetric device may also include information on the acceleration, deceleration, and G-Forces experienced by the EV 110. The EVC 800 may be able to access all of the information recorded by the telemetric device 720. In an embodiment, the telemetric device 720 may also record information pertinent to the smart batteries 130.

The EVC 800 may also be communicatively linked to a navigation system 730. The navigation system 730 is able to determine the location of the EV 110 based on a locating standard such as the Global Positioning System (GPS) or Galileo. The navigation system 730 may provide current location of the EV 110 to the EVC 800. In addition, the navigation system 730 is capable of receiving an input from the user interface 710 that identifies a destination for the EV 110 to travel to. The navigation system 730 is capable of determining an optimal route 1410 from the current location of the EV 110 to the destination using a graph traversal algorithm or any other known technique in the art. In addition, the navigation system 730 may receive from the EVC 800 a list of battery swap centers 900 that contain suitable smart battery packs 130 for use in the EV 110. In response to receiving the list of battery swap centers 1100, the navigation system 730 implements Christofides' algorithm or other similar algorithms that solve the "Traveling Salesmen Problem" to determine an optimal route 1410 to reach at least one of the listed battery swap centers 1100. These battery swap centers 1100 are shown as waypoints 1420A, 1420B, 1420C and 1420D in FIG. 14. The navigation system 730 may instruct the user interface 710 to display the optimal route 1410 from the current location to the destination that includes stops at the battery swap centers 900 that contain suitable batteries. The navigation system 730 may be implemented using dedicated circuits or alternatively using a processor and memory.

The EVC 800 is also communicatively coupled to a communication interface 740. The communication interface 740 enables the EVC 800 to access the Internet 100 over wireless communication channel 105. This enables the EVC 800 to store and retrieve information stored in database server 1000. The communication interface may include one or more antennas, receiving circuits, and transmitting circuits.

Figure 8:
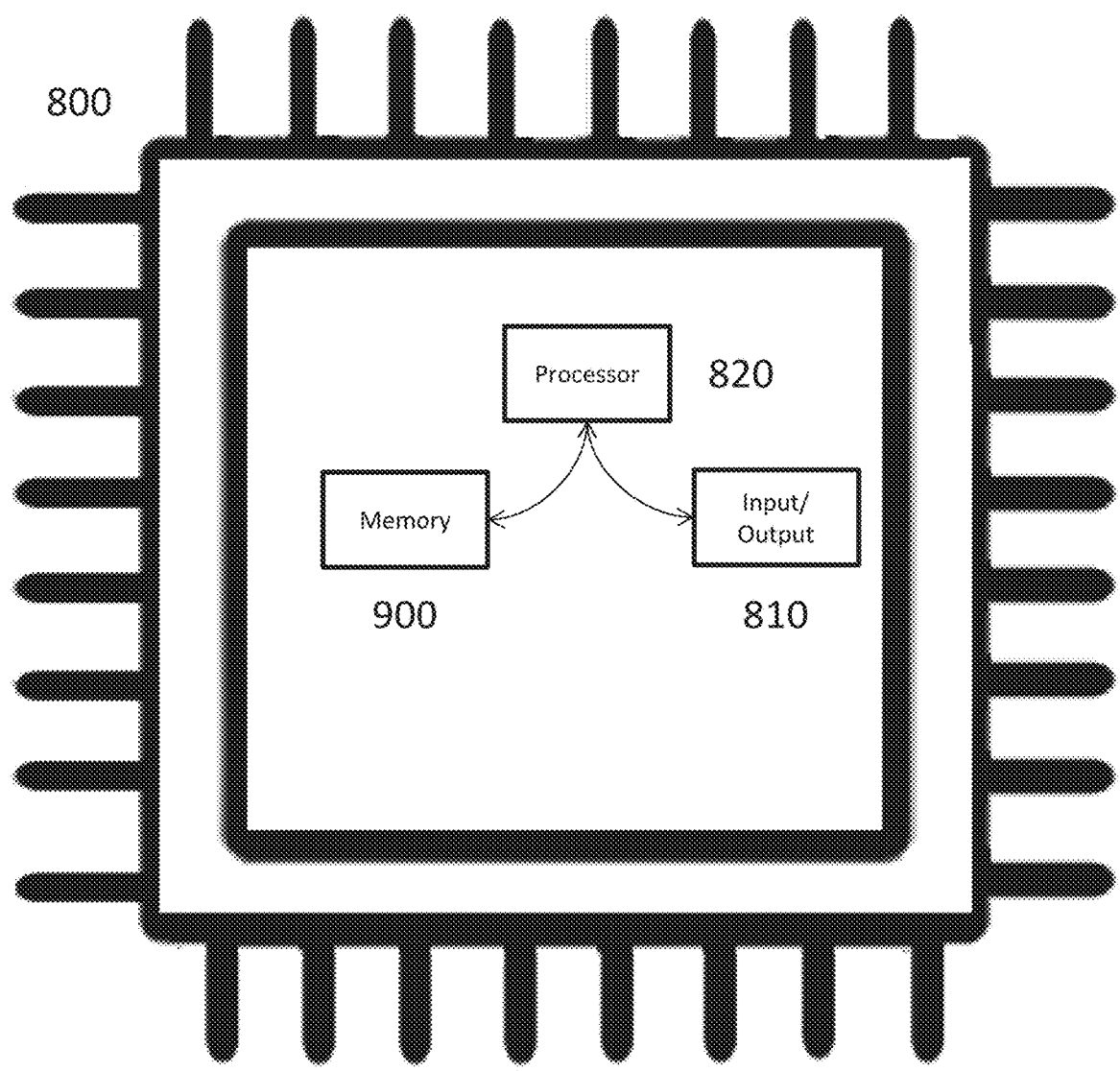
FIG. 8 is a block diagram of the electric vehicle computer.

FIG. 8 depicts a block diagram of the EVC 800. The EVC 800 includes an Input/Output interface 810. The Input/Output interface 810 may facilitate communication of data with the transceiver 410, battery sensors 520, user interface 710, telemetric device 720, navigation system 730 and the communication interface 740. The EVC 800 also includes a processor 820 that is communicatively linked to the Input/Output interface 810 and a memory 900.

Figure 9:
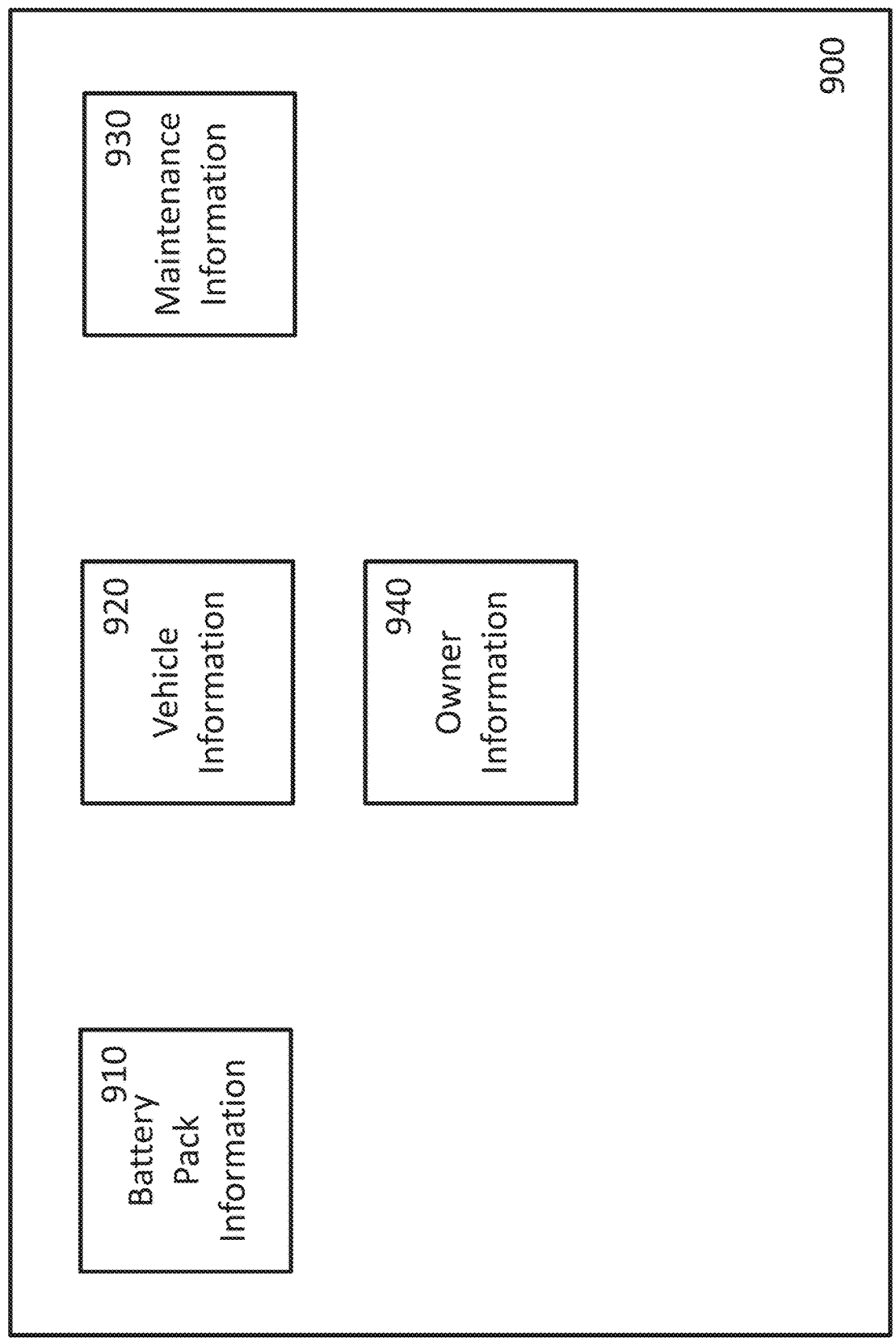
FIG. 9 is a graphic depiction of the information that is stored in the memory of the electric vehicle computer.

The memory 900 stores information battery pack information 910, vehicle information 920, maintenance information 930, and owner information 940 as shown in FIG. 9. The battery pack information 910 may include information such as the manufacturer, model, and installation date of each smart battery pack 130. In addition, the battery pack information 910 may also include the number of times each smart battery pack 130 has been charged and discharged. Further, the battery pack information 910 includes the indication of the health of each smart battery pack determined by the processor 820. The vehicle information 920 may include the make, model, and year of the vehicle. In addition, it may also include the total number of miles driven, average speed, and a unique serial number identifying the EV 110. Further, the vehicle information may also include the measured ambient temperature of the vehicle. The maintenance information 930 may include information regarding the service performed on the vehicle such as the replacement of smart battery packs. In addition, it may also include information on the servicing of brakes and other components of the EV 110. The owner information may include the age and gender of the owner. In addition, it may include usage data on the EV 110. For instance, the usage data may include a log of the time, date, and distance driven for each time the EV 110 is operated. In addition, the usage data may include information on how the driver operates the vehicle. This information may include the average acceleration times, the average stopping times, and the G-forces experienced while cornering.

The processor 820 determines an indicator of the health of each smart battery pack 130 based on the information received from the Input/Output interface 810 and the memory 900. The determination of the health of the battery can be determined based upon any combination of factors. For instance, a six-month old smart battery pack, that has undergone 500 charge/discharge cycles and a high measured operating temperature may be assigned a particular health indication, whereas a four-month old battery that has undergone 400 charge/discharge cycles and has a low resistance, may be assigned a different health indication.

The processor 820 determines when a smart battery pack 130 needs to be swapped out. The processor 820 may determine this based upon comparing the health indication to a threshold. If the health indication is below a threshold, then the smart battery pack needs to be replaced. The threshold of replacement may be dynamically determined based upon the owner information 940 and the vehicle information 920. For instance, a driver that accelerates faster and brakes harder may require more frequent battery replacements, may require more frequent smart battery pack replacements, and therefore, a higher threshold for replacement. Similarly, when an EV 110 is operated in a particularly hot or cold climate as measured by the ambient temperature, the smart battery packs will likely have to be replaced more frequently and will accordingly require a higher threshold for replacement. Therefore, as an example, if a health indication value is 100 for a new battery and 20 is the normal threshold to replace a battery, a driver that accelerates faster and brakes harder, may have a replacement threshold of 30. Similarly, when the smart battery pack 130 is used in a particularly hot climate, the pack will deteriorate quicker, so a replacement threshold of 35 may be used.

Once the processor 820 determines that a particular smart battery pack 130a needs to be replaced, the processor 820 queries the database server 1000 for a list of smart battery packs 130 that are within a threshold of the health indications of the remaining smart battery pack 130b . . . 130n. The processor 820 may dynamically determine the threshold based upon the health indication of the smart battery pack 130a to be replaced. For instance, if the health indication of the battery pack 130a is particularly poor, the processor would utilize a very wide threshold in selecting a replacement. The processor 820 may further limit the query of the database server 1000 to return a list based upon the current location of the EV 110 as determined by the navigation system 730. In addition, the processor 820 may also limit the list returned by query the database server 1000 based upon smart battery packs 130 that are within a predetermined distance of a route 1410 to a destination determined by the navigation system 730. The predetermined distance may be entered through the user interface 710. Once the processor 820 has determined the list of smart battery packs, the processor sends the list to the navigation system 730.

The database server 1000 may be of any form known in the art. The server includes an application that is capable of transmitting and receiving information with the EVC 130, the battery swap centers 1100 and the user device 1610. The application is also capable of retrieving and storing information in one or more tables. The server is capable of storing one or more data tables.

Figure 10:
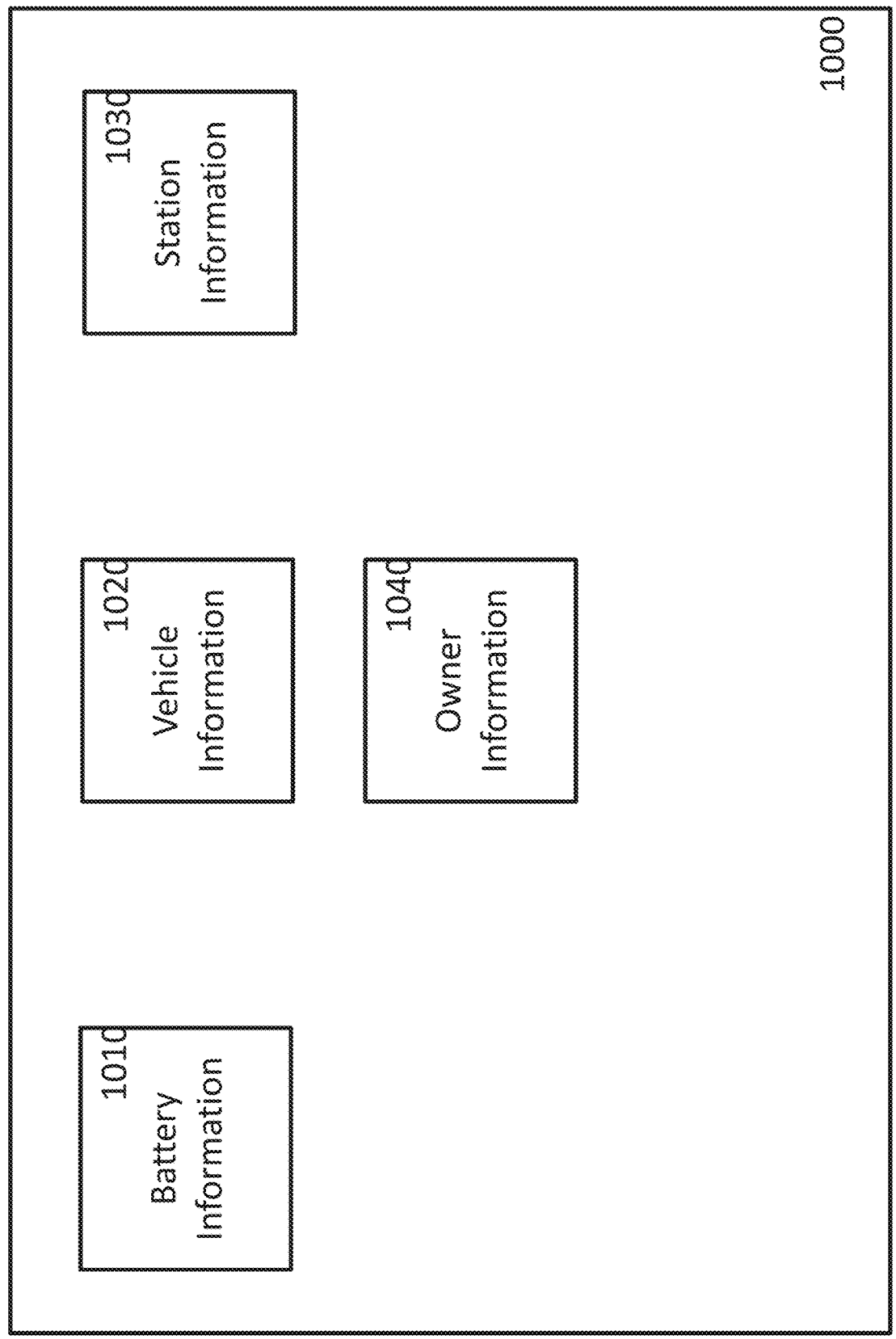
FIG. 10 is a graphic depiction of the tables that may be stored in a server.

FIG. 10 is a graphical depiction of example tables that may be stored in the database server 1000. Those tables may include battery 1010, vehicle information 1020, station information 1030, and owner information 1040.

The battery information table 1010 may include similar information as stored in the battery pack information 910; however, it includes information for all smart battery packs. Specifically, the battery information table may include the smart battery pack health indication. In addition, the battery information 1010 may include an indication of whether the battery is currently installed, at a battery swap center 1100, or has been retired.

The vehicle information table 1020 may include information regarding each particular EV 110 sold by the manufacturer. This information may include the make, model, year, and purchase date of the vehicle. In addition, it may include the number of miles driven and repair history of the vehicle. It may further include the location history of the EV 110.

The station information table 1030 may include information regarding the location of each battery swap center 1100. In addition, the station information table 1030 may include the current inventory of smart batteries stored at the battery swap center.

The owner information table 1040 may include information similar to owner information 940. In addition, the owner information table 1400 may include contact information for the owner. This information may be used by the battery swap center to notify an owner that a suitable battery is available. The information may also include a customer priority. The customer priority would allow for certain inventory of the battery swap centers to be reserved for high priority customers.

Figure 11A:
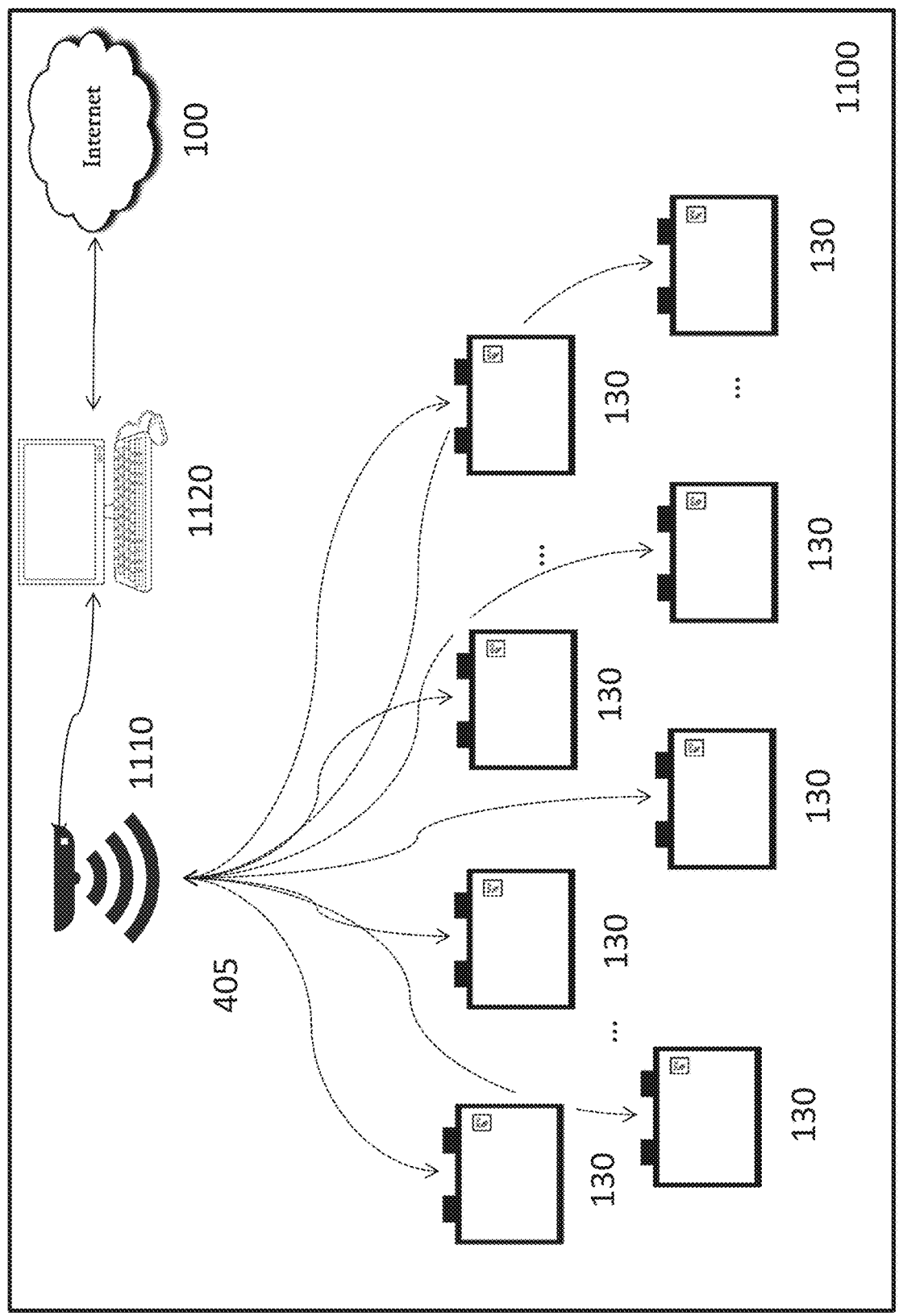
FIG. 11A is a diagram of a battery swap center.

FIG. 11A is a diagram of the battery swap center 1100. The battery swap center 1100 includes a plurality of smart battery packs 130. Each smart battery pack may communicate with the wireless transceiver 1110 using their respective communication module 220 over wireless communication channel 405. The communication with the transceiver 1100 is similar to the communication with transceiver 410. However, information transmitted from the smart battery packs 130 is sent to the center's computer 1120. The swap computer 1120 performs similar functions to the processor 820 to determine the health indication of each smart battery pack. The swap computer 1120 transmits the health indication and other information about each of the smart battery packs 130 over the Internet 100 to the database server 1000.

Figure 11B:
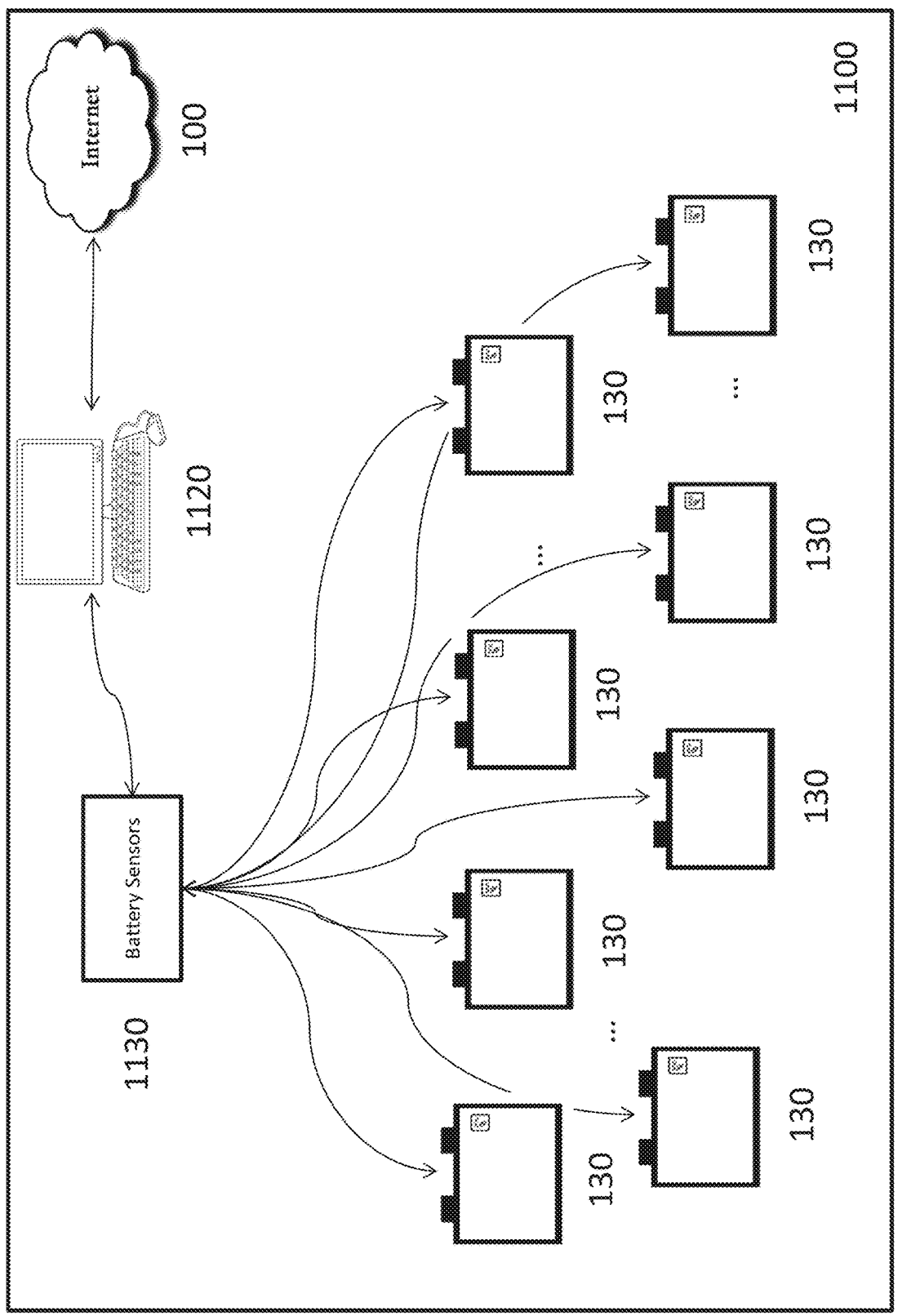
FIG. 11B is another diagram of a battery swap center.

FIG. 11B depicts an additional configuration for the battery swap center 1100. In this configuration, the battery swap center 1100 includes a battery sensor 1130. The operation of the battery sensor 1130 is similar to the operation of the battery sensor 520. Also, like the battery sensor 520, the battery sensor 1130 may be used alone, or in conjunction with sensors 240 of each individual smart battery pack 130. However, in the case of the battery sensor 1130, the measured information is sent to the swap computer 1120.

Figure 12:
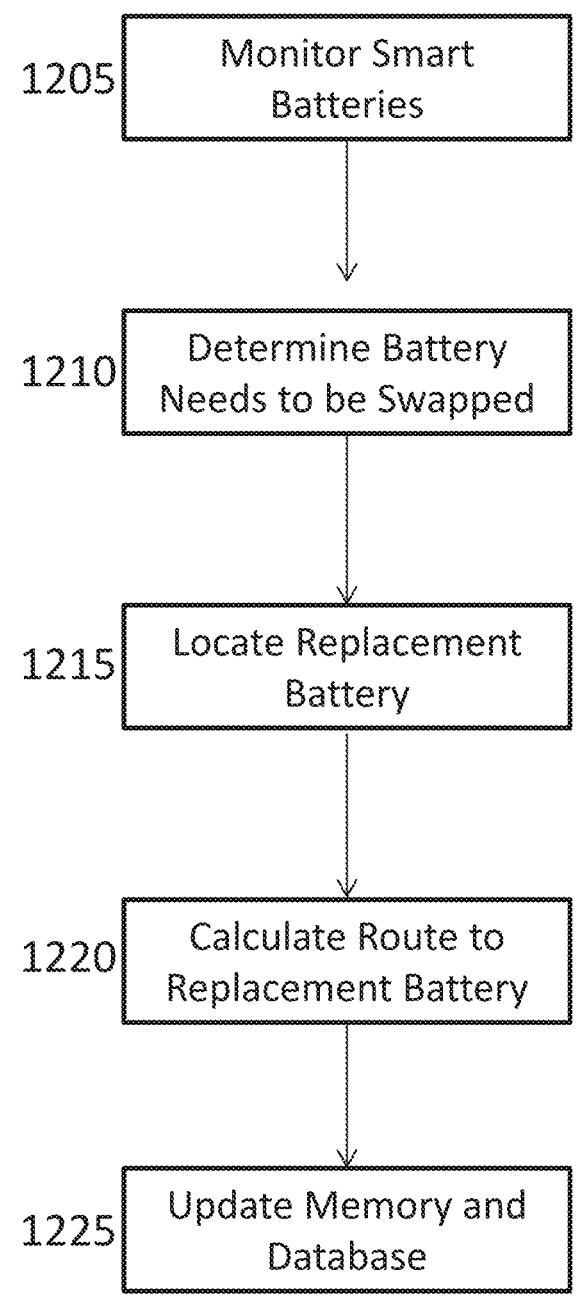
FIG. 12 is a block diagram of the battery swap process.

FIG. 12 is a block diagram of an example process that is implemented to swap out a smart battery pack 130 in an EV 110. The EVC 800 constantly monitors (1205) the health of each of the smart battery packs 130 and indication of the health value of each of the smart battery packs. The EVC 800 then compares the health indication values to a dynamically determined threshold to determine (1210) if one or more smart battery packs 130 need to be swapped. The EVC 800 then queries a database server 1000 to locate (1215) a list of replacement smart battery packs that have a similar health indication. A route 1410 to the battery swap center 1100 is then calculated (1225). A replacement smart battery pack 130 is then installed in the EV 110. The EVC 800 automatically detects that the new smart battery pack 130 has been installed and updates (1225) the memory 900 and instructs the database server to update the battery information table 1010 and the vehicle information 1020 to reflect that the smart battery pack 130 is now installed in the EV 110. In addition, the station information 1030 is also updated to reflect that the smart battery pack 130 is no longer in the battery swap center 1100 inventory.

Figure 13:
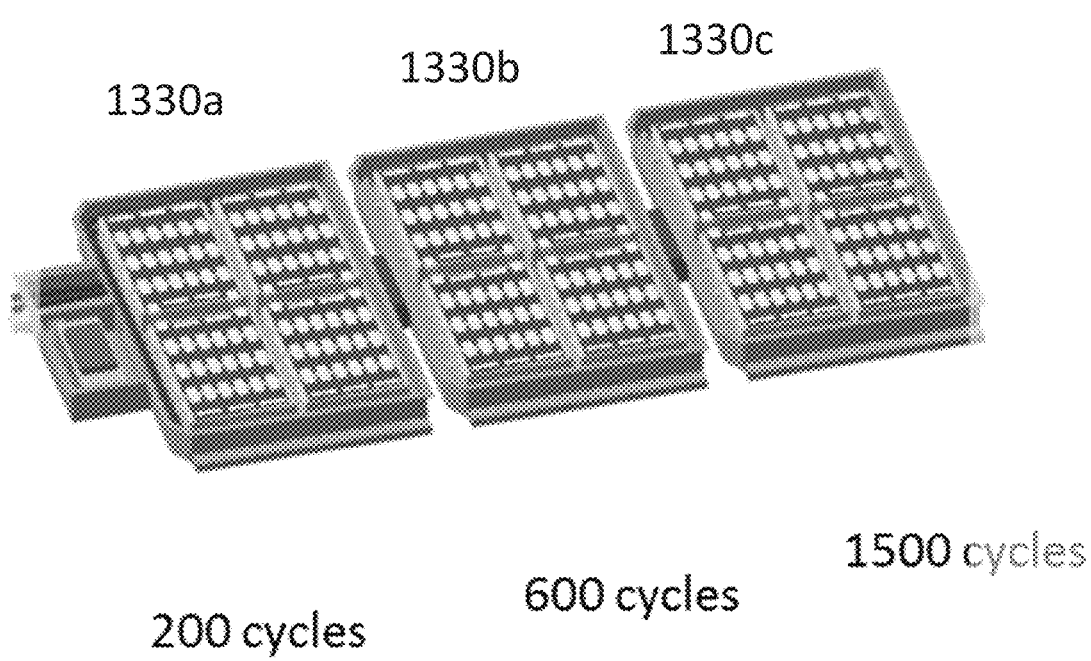
FIG. 13 is a graphic depiction of multiple smart battery packs with different indicators of battery health.

FIG. 13 shows an example of three smart battery packs 1330a, 1330b and 1330c that have undergone a different number of charge/discharge cycles and, therefore, would have a different health status indicator. Assuming all other conditions of the smart battery packs 1330a, 1330b and 1330c were the same, the EVC 800 would determine the smart battery pack 1330c to have a lower health status indicator and, therefore, may require replacement if the health status indicator is below the dynamically determined threshold.

Figure 14:
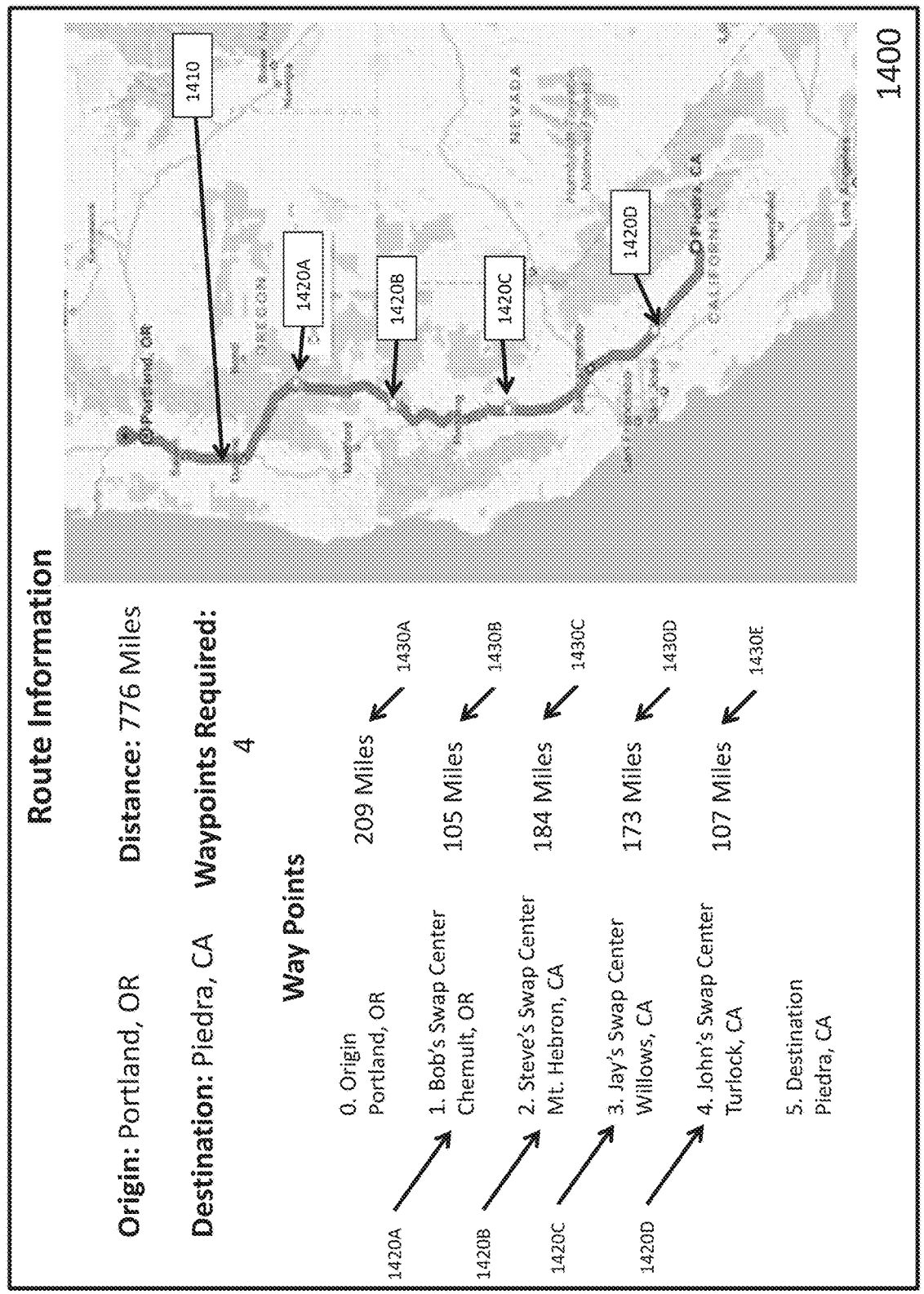
FIG. 14 is an example graphic depiction of a trip route generated by the system.

One of the perceived drawbacks with EVs is that users have been typically limited by the range of the installed battery packs. The present system permits a user to plan and take a trip that extends beyond the range of the installed battery packs by interfacing with one or more battery swap centers 1100 located along the desired trip route. Swapping out discharged battery packs with fully (or even partially) charged battery packs permits the range to be continually extended, as long as fully (or even partially) charged battery packs are available at battery swap centers 1100 along, or close to, the desired route. FIG. 14 depicts an example of user interface 1400 that may be displayed on user interface 710, or 1610. It permits a user to utilize the navigation system 730 and displays a route 1410 that is calculated by navigation system 730 to reach a desired destination and at least one of the battery swap centers 1100 as waypoint 1420, if needed. One or more battery swap centers 1100 may be needed for the desired route if the desired route exceeds the range of the EV 110 based upon the installed smart battery packs 130 installed in the EV 110. The waypoint 1420 may be determined based upon the distance from the route 1410, the inventory of the swap centers 1100 that are stored in station information 1030 of server 1000, and the range of the EV 110 based upon the installed smart battery packs 130. The inventory of the swap center may be searched for smart battery packs 130 that have indication of the health that are within an acceptable health range of other smart battery packs 130 already installed in the EV 110. The acceptable health range may be predetermined or may be dynamically determined based upon the information stored in owner information 940, owner information 1040, the health of the smart battery pack to be replaced or the health indicators of the remaining smart battery packs in the EV 110. The acceptable health range may also be determined based upon statistical measures of dispersion (e.g. range, variance or standard deviation) of the remaining smart battery packs in the EV 110.

The system may identify multiple waypoints 1420 along the route. The number of waypoints may be based on the distance the EV 110 can travel with the currently installed smart battery packs 130. In addition, the system may determine the distance 1430A, 1430B, 1430C, 1430D and 1430E between multiple waypoints.

Figure 15:
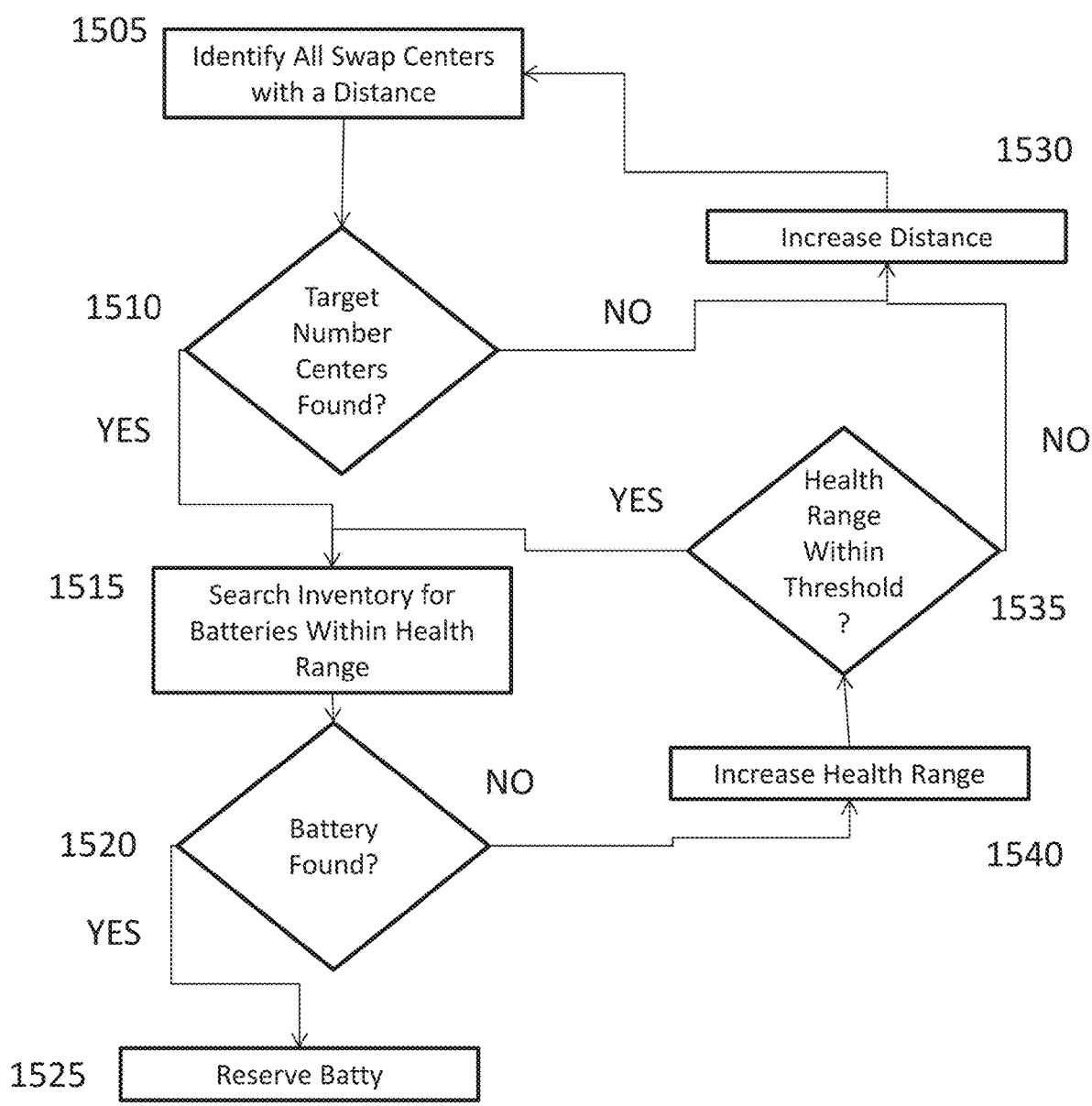
FIG. 15 is a block diagram of the waypoint identification process.

FIG. 15 is a flow diagram for an example process of locating a waypoint 1420. In step 1505, all of the swap centers 1100 within a target distance along a route determined by the navigation system 730 are located based upon the information stored in the station information 1030. The target distance may a predetermined fixed distance or may be dynamically determined based upon the length of the route to be traveled, the owner information 940, owner information 1040, the health indicators of the smart battery pack to be swapped or the health indicators of the remaining smart battery packs in the EV 110. In step 1510, it is determined if a required number of swap centers 1100 are within the target range. Alternatively, the target range may be based upon the amount of time that it is expected that the EV 110 will take to traverse the distance. The target number of swap centers 1100 may be fixed number or be determined based upon the density of swap centers in a given geography. For instance, the target number may be higher in a region where there are more swap centers 1100. If there are less than the target number of swap centers 1100 within the target distance, the target distance is increased in step 1530. Station information 1030 is then searched with the increased range in step 1505.

If the target number of swap centers 1100 are determined to be located in step 1510, the inventory of the swap centers 1100 are searched for smart battery packs 130 that have health indicators within the acceptable health range. If more than one smart battery pack 130 are within the acceptable health range, a particular smart battery pack 130 may be selected based on the similarity of the smart battery pack health indicator with the remaining smart battery packs 130, the distance to the swap center 1100 or a weighted combination of the health indicator similarity and the distance to the swap center. Once a particular smart battery pack 130 is identified, the smart battery pack 130 is removed from the inventory of the swap center 1100 and a notification is sent to the swap center computer 1120 in step 1525.

If a smart battery pack 130 is not found to be within the acceptable health range in step 1520, the acceptable health range is broadened in step 1540. The broadened health range is then compared to a health range threshold in step 1535. The health range threshold may be predetermined or dynamically determined based upon any values known to the system. If the broadened health range is less than the threshold, the inventory of smart battery packs is searched with the broadened health range in step 1515. If the broadened health range is greater than the threshold, the distance is increased in step 1530.

Figure 16:
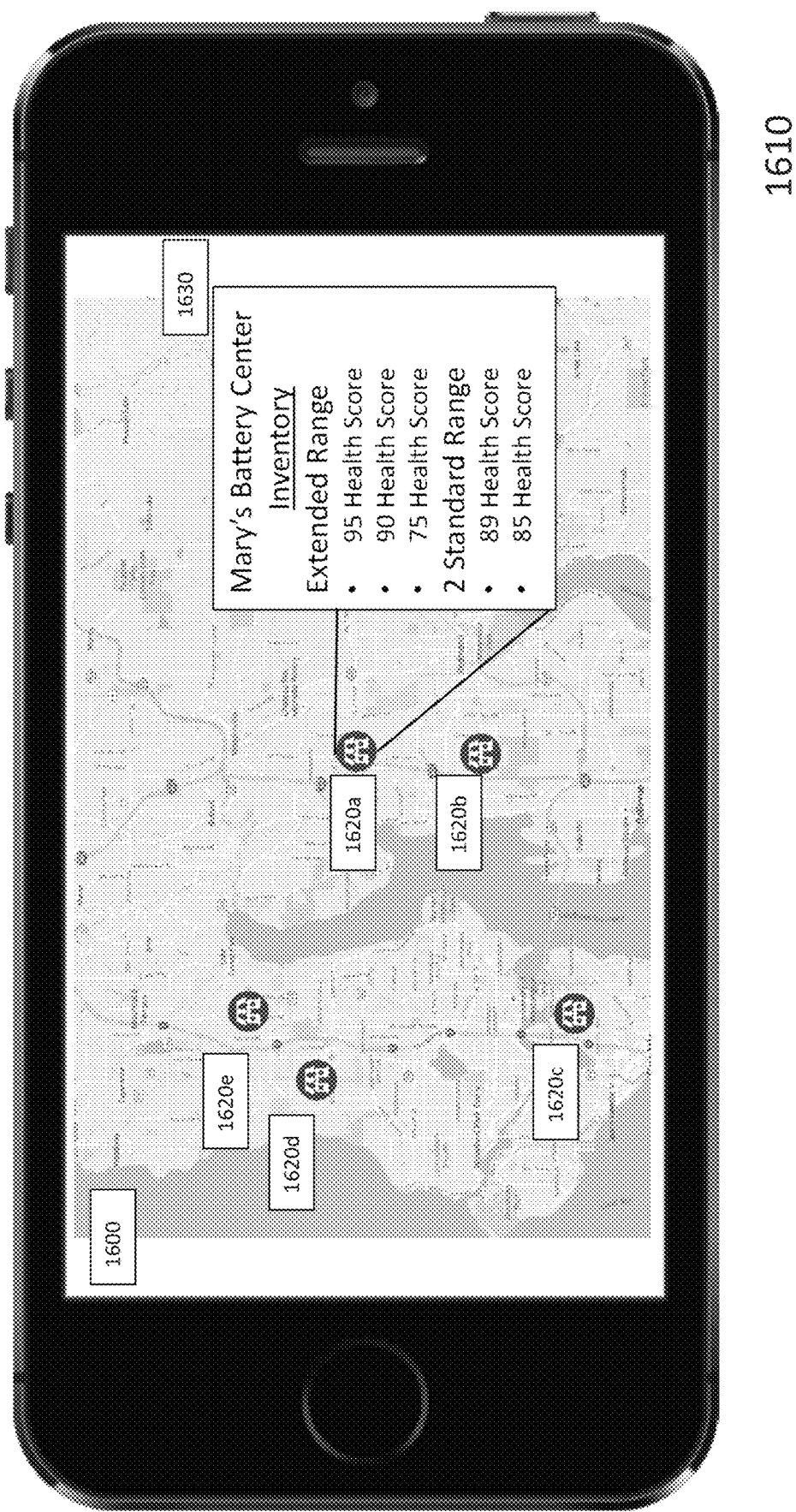
FIG. 16 is an example user interface showing information collected by the system.

FIG. 16 depicts a user interface 1600 that may be displayed on a user device 1610. This interface allows the owner to view a graphical representation of swap centers 1620A, 1620B, 1620C, 1620D and 1620E that are within range. The inventory of smart battery packs 1630 for the swap centers 1100 may be extracted from the station information table 1030 of the database server 1000 and displayed to the user. The displayed inventory information 1630 may include the type of battery and health score of the batteries that are available at a given swap center. In addition, the user interface 1600 allows information saved in the vehicle information 1020, such as the location history to be displayed. Although, the user interface is shown on a phone, a person of ordinary skill would appreciate that a similar user interface could be displayed on a computer, tablet or similar device.

Figure 17:
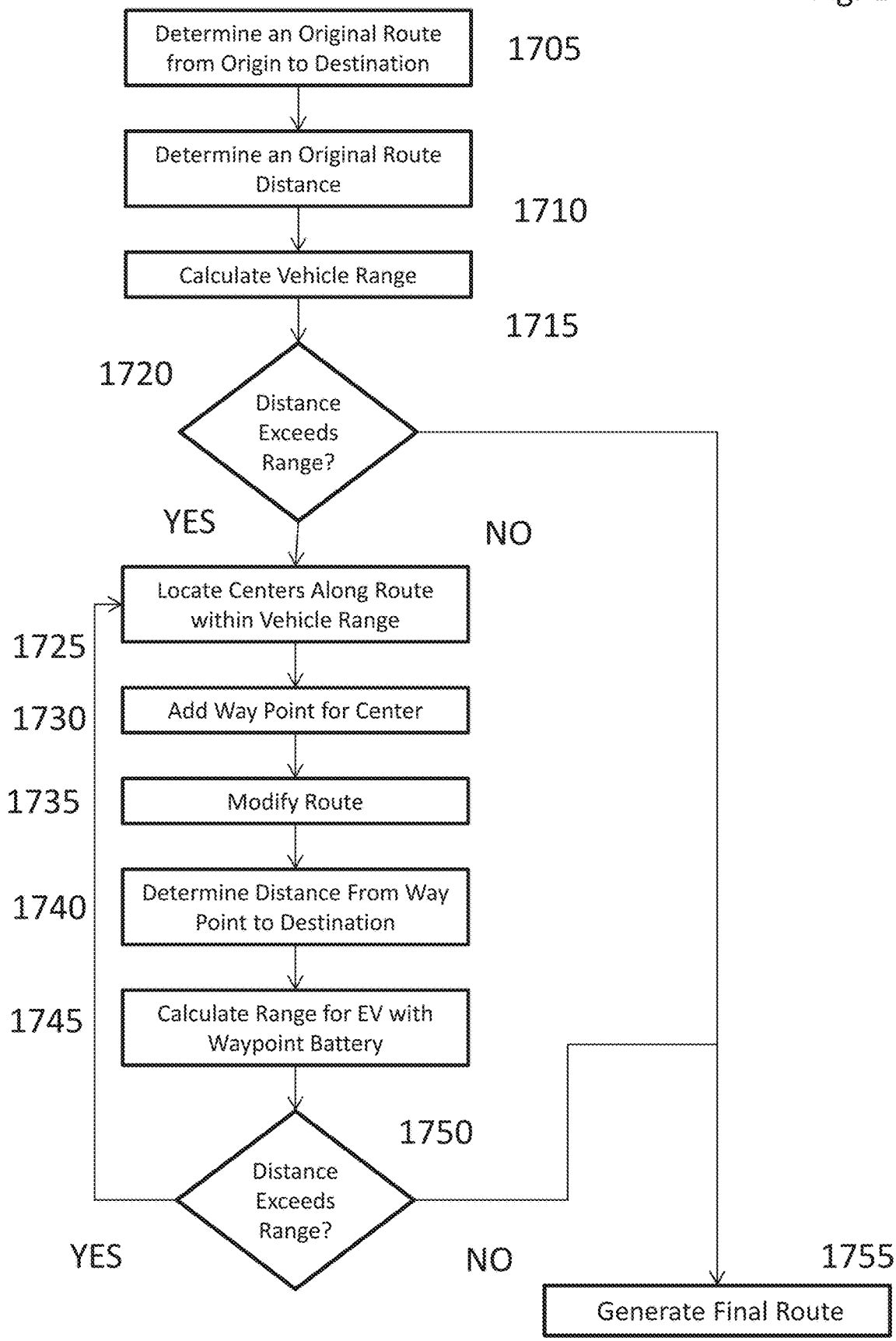
FIG. 17 is a block diagram for the process of determining a route.

FIG. 17 is a flow diagram for an example process of identifying a route 1410 performed by the navigation system 730. In response to receiving an input of a destination, the navigation system 730 determines an original route from current location of the EV 110 to the destination (1705). The distance along the original route is then calculated (1710). The range of the EV 110 is then calculated based upon the health indicator values of the smart battery packs 130a . . . 130n. (1715). The range for the EV is then compared with the original distance (1720). If the distance along the original route does not exceed the range for the EV, the original route with no waypoints 1420 is used as route 1410. If the distance along the original route exceeds the range of the EV, the system then determines battery swap centers 1100 that are within the range of the EV and along the route (1725). To locate the swap centers 1100, the system may implement the method shown in FIG. 15. Once a swap center is located, the particular swap center is added as a way point (1730). The modified route is then calculated to include the waypoint (1735). The distance between the waypoint and the destination is then calculated (1740). The range of the EV 110 is then calculated with the smart battery pack from the way point. (1745). The distance from the waypoint to the destination is then compared (1750). If the distance from the waypoint to the destination is less than the range of the EV with the smart battery pack from the swap center, the modified route with the waypoints 1420 is used as the route 1410 (1755). If the distance from the waypoint to the destination exceeds the range of the EV 110 with the smart battery pack, the process returns to 1725 and additional waypoints are added.

Although features and elements are described above in particular combinations, one of ordinary skill in the art will appreciate that each feature or element can be used alone or in any combination with the other features and elements. In addition, any of the steps described above may be automatically performed by either the EVC 800, swap computer 1120, or database server 1000.

Furthermore, the methods described herein may be implemented in a computer program, software, or firmware incorporated in a computer-readable medium for execution by a computer or processor. Examples of computer-readable media include electronic signals (transmitted over wired or wireless connections) and non-transitory computer-readable storage media. Examples of non-transitory computer-readable storage media include, but are not limited to, a read only memory (ROM), a random access memory (RAM), a register, cache memory, semiconductor memory devices, magnetic media, such as internal hard disks and removable disks, magneto-optical media, and optical media such as CD-ROM disks, and digital versatile disks (DVDs).

What is claimed is:

1. A system for monitoring batteries in an electric vehicle, the system comprising:
a plurality of smart battery packs;
a transceiver communicatively coupled to each of the plurality of the smart battery packs;
an electric vehicle computer communicatively coupled to the transceiver;
a navigation system communicatively coupled to the electric vehicle computer; and
a communication interface communicatively coupled to the electric vehicle computer;
wherein the transceiver:
receives a unique identifier and a battery pack health indicator value for each of the plurality of smart battery packs;
wherein the electric vehicle computer:
determines one or more smart battery packs to be replaced and one or more smart battery packs to remain from the plurality of smart battery packs based on the battery pack health indicator values of the plurality of smart battery packs,
locates one or more replacement smart battery packs from a database based on the battery pack health indicator values of the one or more smart packs to remain, and
ascertains geographic locations for each of the one or more replacement smart battery packs;
wherein the navigation system:
calculates a route to be traveled from an origin to a destination, and
modifies the route to include one or more waypoints for the geographic locations;
wherein the communication interface:
transmits the unique identifier and the battery pack health indicator value for each of the plurality of smart battery packs to the database;
wherein the electric vehicle computer further determines the one or more smart battery packs to be replaced and the one or more smart battery packs to remain based on a stored error history of each of the plurality of smart battery packs.

2. The system according to claim 1, further comprising: one or more battery sensors;
wherein the one or more battery sensors measure one or more operational parameters of the plurality of smart battery packs;
wherein the electric vehicle computer further determines the one or more smart battery packs to be replaced and the one or more smart battery packs to remain based on the one or more operational parameters measured by the one or more battery sensors.

3. The system according to claim 1, wherein the electric vehicle computer:
identifies battery swap centers within a distance of a determined geographic location of the electric vehicle,
searches an inventory of smart battery packs for the identified battery swap centers to locate the one or more replacement smart battery packs based on the battery pack health indicator values of the one or more smart battery packs to be replaced, and
reserves the one or more replacement smart battery packs in the database so that the one or more replacement smart battery packs do not appear in subsequent searches of the inventory.

4. The system according to claim 3, wherein the electric vehicle computer:
compares a count of the battery swap centers within the distance of the determined geographic location to a target number, and
if the count is less than the target number, increases the distance to an increased distance and identifies battery swap centers within the increased distance.

5. The system according to claim 3, wherein the electric vehicle computer further searches the inventory of smart battery packs for the identified battery swap centers based on an acceptable health range,
wherein the acceptable health range is determined based on a highest battery pack health indicator value of the one or more smart battery packs to remain and a lowest battery pack health indicator value of the one or more smart battery packs to remain.

6. The system according to claim 1, wherein the electric vehicle computer further determines the one or more smart battery packs to be replaced and the one or more smart battery packs to remain based on a replacement threshold;
wherein the replacement threshold is determined based on stored usage information of the electric vehicle.

7. The system according to claim 1, wherein the electric vehicle computer further determines the one or more smart battery packs to be replaced and the one or more smart battery packs to remain based on a replacement threshold;
wherein the replacement threshold is determined based on stored information about an owner of the electric vehicle.

8. The system according to claim 1, further comprising:
a telemetric device communicatively coupled to the electric vehicle computer;
wherein the telemetric device measures and records acceleration and braking information as the electric vehicle is driven;
wherein the electric vehicle computer further determines the one or more smart battery packs to be replaced and the one or more smart battery packs to remain based on a replacement threshold;
wherein the replacement threshold is determined based on stored information about an owner of the electric vehicle.

9. The system according to claim 1, wherein the electric vehicle computer further determines the one or more smart battery packs to be replaced and the one or more smart battery packs to remain based on a stored charging history of each of the plurality of smart battery packs.

10. The system according to claim 1, wherein the electric vehicle computer further determines the one or more smart battery packs to be replaced and the one or more smart battery packs to remain based on a stored usage history of each of the plurality of smart battery packs.

11. The system according to claim 1, further comprising:
a temperature sensor that measures an ambient temperature surrounding the plurality of smart battery packs when the electric vehicle is not in operation;
wherein the electric vehicle computer further determines the one or more smart battery packs to be replaced and the one or more smart battery packs to remain based on the ambient temperature.

12. The system according to claim 1, wherein the error history for each of the plurality of smart battery packs includes information about detected errors for the plurality of smart battery packs and about times, dates, and locations of the detected errors.

13. The system according to claim 12, wherein the detected errors include errors related to one or more of over-voltage, under-voltage, over current, under current, or over temperature of the plurality of smart battery packs.

* * * * *